US010815845B2

(12) United States Patent
Jinnouchi et al.

(10) Patent No.: US 10,815,845 B2
(45) Date of Patent: Oct. 27, 2020

(54) VARIABLE OIL PUMP

(71) Applicant: AISIN SEIKI KABUSHIKI KAISHA, Kariya-shi, Aichi-ken (JP)

(72) Inventors: Tetsuya Jinnouchi, Toyota (JP); Hirohito Terashima, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 16/259,249

(22) Filed: Jan. 28, 2019

(65) Prior Publication Data

US 2019/0234255 A1 Aug. 1, 2019

(30) Foreign Application Priority Data

Jan. 31, 2018 (JP) .................................. 2018-014681

(51) Int. Cl.
*F01M 1/02* (2006.01)
*F01M 1/16* (2006.01)
*F16N 13/20* (2006.01)

(52) U.S. Cl.
CPC ................ *F01M 1/02* (2013.01); *F01M 1/16* (2013.01); *F16N 13/20* (2013.01); *F01M 2001/023* (2013.01); *F01M 2001/0238* (2013.01); *F01M 2001/0246* (2013.01); *F01M 2001/0253* (2013.01); *F01M 2001/0292* (2013.01)

(58) Field of Classification Search
CPC .... F01M 1/02; F01M 2001/0246; F01M 1/16; F01M 2001/0238; F01M 2001/0253; F01M 2001/0292; F16N 13/20
See application file for complete search history.

(56) References Cited

U.S. PATENT DOCUMENTS

| 2015/0354564 A1* | 12/2015 | Takahashi | ............. F04C 13/002 418/19 |
| 2018/0187676 A1* | 7/2018 | Saga | ....................... F04C 15/06 |

FOREIGN PATENT DOCUMENTS

JP         2015232293 A      12/2015

* cited by examiner

*Primary Examiner* — Jacob M Amick
(74) *Attorney, Agent, or Firm* — Buchanan Ingersoll & Rooney PC

(57) ABSTRACT

A variable oil pump includes a pump housing, an oil pump rotor accommodated in the pump housing, an adjustment member accommodated in the pump housing and configured to adjust a discharge amount of oil discharged from the oil pump rotor by displacing in a state where the adjustment member holds the oil pump rotor from an outer circumferential side in such a manner that the oil pump rotor is rotatable, and a guide portion including a guide hole provided at the adjustment member and a pin provided at the pump housing and engaging with the guide hole. The guide portion is configured to guide a displacement of the adjustment member relative to the pump housing by allowing the guide hole and the pin to engage with each other. The variable oil pump includes a drain passage configured to drain oil accumulated in the guide hole.

7 Claims, 10 Drawing Sheets

FIG. 3  First embodiment

Cross-sectional view taken along line IV-IV

Cross-sectional view taken along line V-V

Second embodiment

Third embodiment

Fourth embodiment

VARIABLE OIL PUMP

CROSS REFERENCE TO RELATED APPLICATIONS

This application is based on and claims priority under 35 U.S.C. § 119 to Japanese Patent Application 2018-014681, filed on Jan. 31, 2018, the entire content of which is incorporated herein by reference.

TECHNICAL FIELD

This disclosure generally relates to a variable oil pump.

BACKGROUND DISCUSSION

A conventionally known variable oil pump includes a pump housing, and an adjustment member adjusting a discharge amount of oil discharged from an oil pump rotor (for example, JP2015-232293A which will be hereinafter referred to as Patent reference 1).

Patent reference 1 discloses a known variable oil pump including a pump housing, an oil pump rotor and an adjustment member accommodated in the pump housing. The pump housing and the adjustment member are provided with a pin and an elongated guide hole, respectively, which engage with each other.

The oil pump rotor includes a drive rotor and an annular driven rotor arranged to surround the drive rotor. The oil pump rotor is configured to pressure-feed oil from an inlet port to a discharge port via a volume chamber formed between the drive rotor and the driven rotor.

The known variable oil pump is configured to displace the adjustment member (rotate the adjustment member) about the drive rotor serving as a center by hydraulic pressure, and thus the variable oil pump performs a pump volume control, which allows increment and decrement of a discharge amount of oil, by moving a rotational center of the driven rotor relative to a rotational center of the drive rotor. When the adjustment member displaces (rotates), the guide hole of the adjustment member is moved in a predetermined direction along the pin of the pump housing. The guide hole is substantially tightly sealed with a contact surface (a sliding surface) of the adjustment member and the pump housing.

According to the known variable oil pump described in Patent reference 1, however, the oil enters the guide hole via the contact surface (the sliding surface) of the adjustment member and the pump housing, and then is accumulated in the guide hole. Accordingly, when the adjustment member displaces, inconvenience arises that the oil accumulated in the guide hole inhibits the guide hole and the pin to move relatively to each other, thereby serving as resistance of the displacement of the adjustment member. As a result, a problem arises that responsiveness of the pump volume control decreases. In particular, viscosity of the oil increases at low temperatures, and therefore the resistance of the displacement of the adjustment member increases extremely.

A need thus exists for a variable oil pump which is not susceptible to the drawback mentioned above.

SUMMARY

According to an aspect of this disclosure, a variable oil pump includes a pump housing, an oil pump rotor accommodated in the pump housing and configured to be driven to rotate, and an adjustment member accommodated in the pump housing. The adjustment member is configured to adjust a discharge amount of oil discharged from the oil pump rotor by displacing in a state where the adjustment member holds the oil pump rotor from an outer circumferential side in such a manner that the oil pump rotor is rotatable. The variable oil pump includes a guide portion including a guide hole provided at the adjustment member, and a pin provided at the pump housing and engaging with the guide hole. The guide portion is configured to guide a displacement of the adjustment member relative to the pump housing by allowing the guide hole and the pin to engage with each other. The variable oil pump includes a drain passage configured to drain oil accumulated in the guide hole.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

The embodiments disclosed here will be described below with reference to the drawings.

First Embodiment

A structure of a variable oil pump 100 according to a first embodiment will be described with reference to FIGS. 1 to 8.

(Overall Structure of the Variable Oil Pump)

Figure 1:
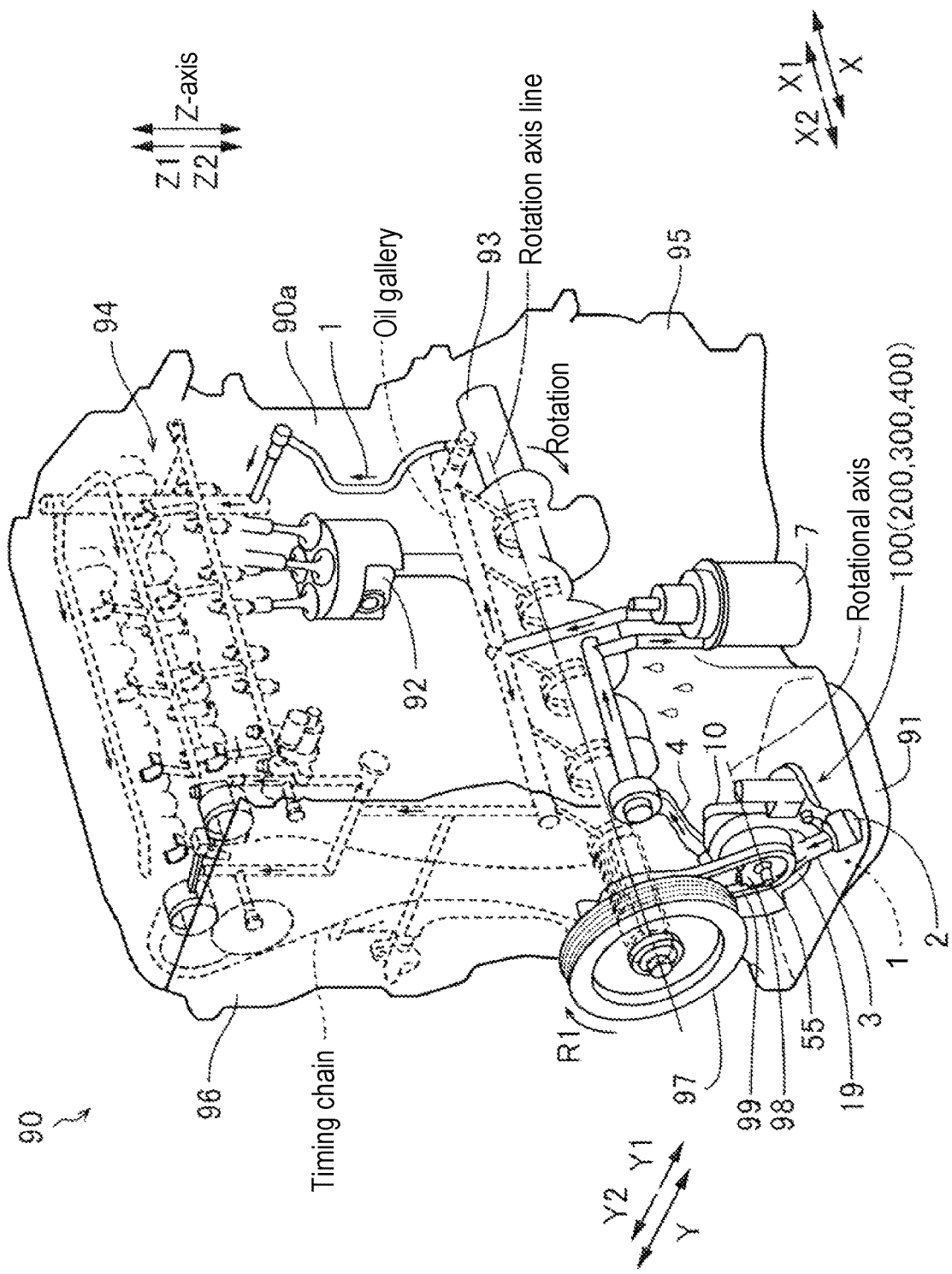
FIG. 1 is a perspective view illustrating an engine on which a variable oil pump according to first, second, third and fourth embodiments disclosed here is configured to be mounted.

As illustrated in FIG. 1, the variable oil pump 100 according to the first embodiment is configured to be mounted on an automobile or a vehicle provided with an engine 90. The variable oil pump 100 includes a function of pumping up oil (engine oil) 1 in an oil pan 91 and supplying (pressure-feeding) the oil to movable portions (sliding portions) including plural pistons 92, a crank shaft 93 and a valve mechanism 94.

Figure 2:
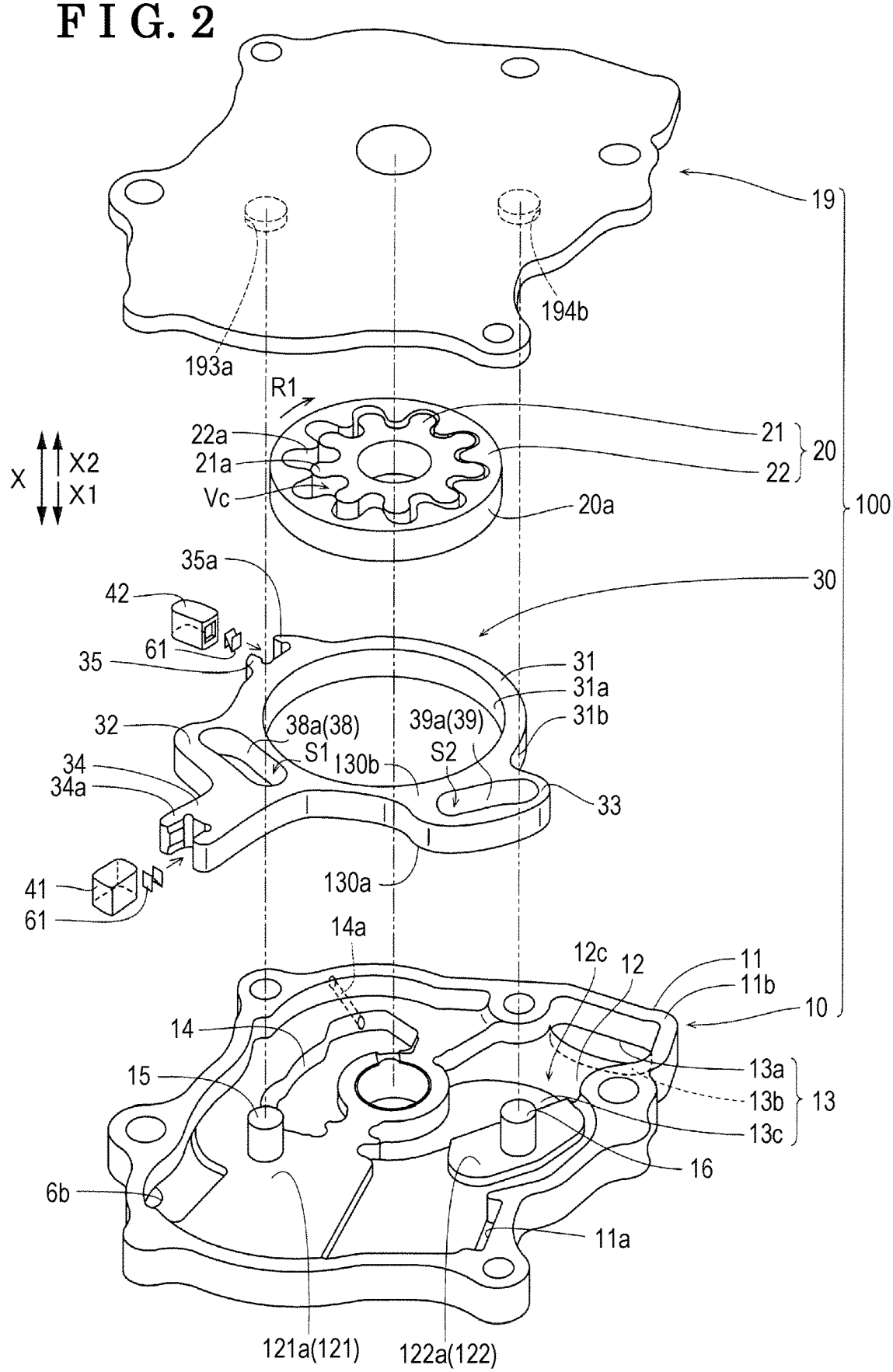
FIG. 2 is an exploded perspective view illustrating the variable oil pump according to the first embodiment.

As illustrated in FIG. 2, the variable oil pump 100 includes a body 10 (an example of a housing main body and an example of a pump housing), an oil pump rotor 20, an adjustment ring 30 (an example of an adjustment member) and a cover 19 (another example of the pump housing).

The cover 19 is placed over the body 10 from a direction X2 side towards a direction X1 side so as to cover the body 10. The body 10 and the cover 19 accommodate, at an inner side thereof, the adjustment ring 30 in such a manner that the body 10 and the cover 19 sandwich the adjustment ring 30 therebetween. The oil pump rotor 20 is provided inside the body 10 to be rotatable. The oil pump rotor 20 includes an inner rotor 21 corresponding to an external gear and an outer rotor 22 corresponding to an internal gear. The adjustment ring 30 holds the oil pump rotor 20 from an outer circumferential-side in such a manner that the oil pump rotor 20 is rotatable. A coil spring 60 biases the adjustment ring 30 towards an initial position P1 (in a clockwise direction about the inner rotor 21 illustrated in FIG. 7). The adjustment ring 30 is configured to rotate about the inner rotor 21 with the use of a capacity varying mechanism which will be described later, against the biasing force of the coil spring 60. The rotation of the adjustment ring 30 will be described in detail later.

Figure 6:
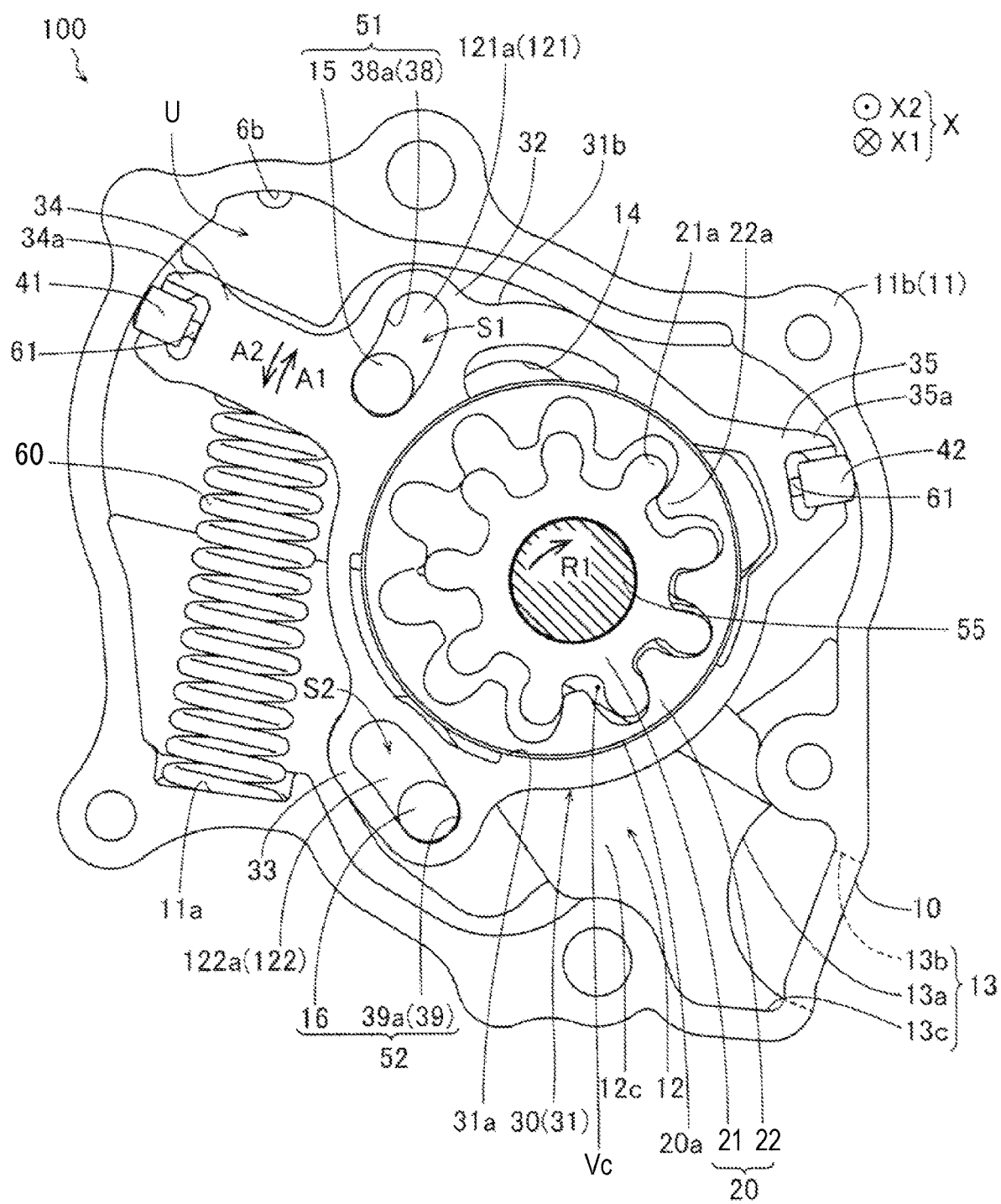
FIG. 6 is a front view illustrating an internal structure of the variable oil pump according to the first embodiment.

As illustrated in FIG. 6, a rotational center of the inner rotor 21 is eccentric relative to a rotational center of the outer rotor 22 by a predetermined amount. When the inner rotor 21 rotates in a direction R1 (clockwise direction), the outer rotor 22 rotates in the same direction with a time delay or in a delayed manner. During the rotations, external teeth 21a of the inner rotor 21 and internal teeth 22a of the outer rotor 22 engage with each other in a region where a distance from the inner rotor 21 to the outer rotor 22 is short. Contrary to this, in a region where the distance from the inner rotor 21 to the outer rotor 22 is long, a volume chamber Vc is gradually formed between the inner rotor 21 and the outer rotor 22 because the number of external teeth 21a of the inner rotor 21 is smaller than the number of internal teeth 22a of the outer rotor 22 by one. As the volume chamber Vc rotates and moves in the direction R1, the volume chamber Vc expands and contracts, thereby generating a pumping function of the oil pump rotor 20.

Each of the external teeth 2a of the inner rotor 21 includes a tooth profile in which a face width is narrower or smaller and a tooth depth is extended radially outward to be longer, compared to an external tooth of an inner rotor of a general trochoid pump. The internal teeth 22a of the outer rotor 22 are formed to match the teeth profiles of the external teeth 21a so as to be engageable with the external teeth 21a. Accordingly, the oil pump rotor 20 is configured such that a larger capacity or volume is assured at the volume chamber Vc formed in the oil pump rotor 20.

As illustrated in FIG. 1, the variable oil pump 100 is arranged at a diagonally lower side (towards Z2 in FIG. 1) relative to the crank shaft 93 provided inside a crank case 95. According to the engine 90, a chain cover 96 including a vertically elongated configuration is fastened to a side end surface of an engine block 90a including the crank case 95, the side end surface which is positioned at the direction X2 side. A region of a lower end portion (at the direction Z2 side) of the chain cover 96 is fastened to a side end surface of the crank case 95, the side end surface which faces the oil pan 91. An end portion of the crank shaft 93, the end portion which is at the X2 side, is exposed to an outside (towards the direction X2 side) via an oil seal fitted in a through hole provided at the chain cover 96, and a crank pulley 97 is attached to the above-described exposed portion of the crank shaft 93.

The variable oil pump 100 is arranged inside the chain cover 96. A timing chain 99 is placed on the crank shaft 93 and on a sprocket 98 at an input shaft 55. A drive force of the crank shaft 93 is transmitted to the input shaft 55 via the timing chain 99, which is for driving the oil pump, and via the sprocket 98. Thus, the oil pump rotor 20 is rotated by the input shaft 55 press-fitted in the inner rotor 21.

(Detailed Structure of the Variable Oil Pump)

As illustrated in FIG. 2, the body 10 is a casting made of aluminum alloy and including a recessed shape (a bowl shape). The body 10 includes a wall portion 11 formed in an annular shape and surrounding an outer edge portion of the body 10, and a bottom portion 12 connecting the wall portion 11. That is, the wall portion 11 is a side wall portion projecting towards the direction X2 from an outer edge portion of the bottom portion 12. The recessed portion formed by the wall portion 11 and the bottom portion 12 is an accommodation recessed portion 12c (an inner space portion inside the annular wall portion 11). It is configured such that the cover 19 is attached to the body 10 in a state where the oil pump rotor 20, the adjustment ring 30 and the coil spring 60 (refer to FIG. 6) are accommodated in the accommodation recessed portion 12c while a predetermined positional relation with one another is maintained.

The body 10 is provided with an inlet port (suction port) 13 taking in or suctioning the oil 1 (refer to FIG. 1) and a discharge port 14 discharging the oil 1 (refer to FIG. 1).

The inlet port 13 includes an opening portion 13a to which an end of piping 3 (refer to FIG. 7) at the downstream side is connected. The other end of the piping 3 at the upstream side is provided with an oil strainer 2 arranged in a state of being immersed in the oil 1 so that the oil 1 in the oil pan 91 is pumped up. An oil passage 13b (a route of the oil 1) is provided inside the piping 3. The oil passage 13b is connected from the oil pan 91 to the inlet port 13. The inlet port 13 is provide to overlap with part of the volume chamber Vc in a plain view (when seen in the direction X) and to be in fluid communication with the volume chamber Vc, such that the oil 1 in the inlet port 13 flows into the volume chamber Vc. A downstream portion 13c (which is, generally, the part overlapping with the volume chamber Vc) of the inlet port 13 is formed by making the bottom portion 12 recessed to correspond to an inlet range, and thus the downstream portion 13c includes a shallow groove shape.

The discharge port 14 is formed by making the bottom portion 12 recessed to correspond to a discharge range, and thus the discharge port 14 includes a shallow groove shape. The discharge port 14 is connected to a discharge oil passage 4 (refer to FIG. 7) via an oil passage 14a provided inside the body 10. The discharge port 14 is provided to overlap with part of the volume chamber Vc in a plain view (when seen in the direction X) and to be in fluid communication with the volume chamber Vc so that the oil 1 in the volume chamber Vc flows into the discharge port 14.

The bottom portion 12 of the body 10 is provided with step portions 121 and 122 each formed to protrude in the direction X2. The step portions 121 and 122 respectively include body sliding surfaces 121a and 122a each extended in a direction which is perpendicular to the direction X. The body sliding surfaces 121a and 122a are positioned in the same plane as each other (that is, the positions of the body sliding surfaces 121*a* and 122*a* in the direction X are same as each other).

Each of the body sliding surfaces 121*a* and 122*a* is in contact with a ring sliding surface 130*a* of the adjustment ring 30. The ring sliding surface 130*a* is one surface (a surface positioned at the direction X1 side) of the adjustment ring 30. Each of the body sliding surfaces 121*a* and 122*a* slides and move relative to the ring sliding surface 130*a* when the adjustment ring 30 rotates relative to the body 10.

The step portions 121 and 122 (the body sliding surfaces 121*a* and 122*a*) are provided with pins 15 and 16, respectively. Each of the pins 15 and 16 includes a columnar cylindrical shape protruding in the direction X2. The pins 15 and 16 are configured to engage with guide holes 38 and 39 of the adjustment ring 30, respectively. This aspect will be described in detail later in detail.

The wall portion 11 of the body 10 includes a body contact surface 11*b* formed at an end portion of the body 10 at the direction X2 side and being in contact with the cover 19.

The cover 19 is attached to the body 10 with a fastening member from the direction X2 side in FIG. 2 in a state where a cover contact surface (an end surface at the direction X1 side) of the cover 19 is in contact with the body contact surface 11*b*.

Figure 3:
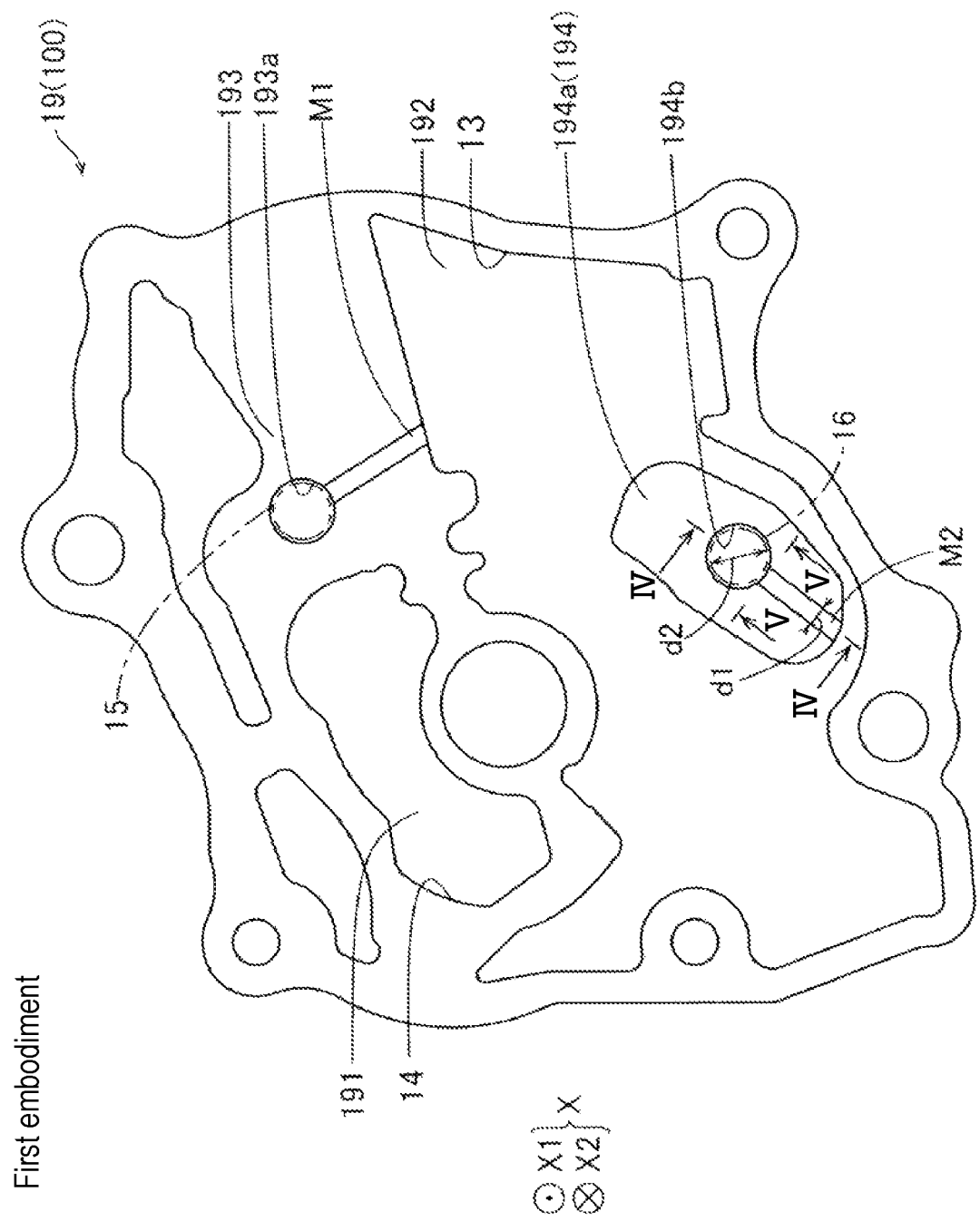
FIG. 3 is a front view illustrating a cover, which is provided with a groove portion, of the variable oil pump according to the first embodiment.

As illustrated in FIG. 3, the cover 19 includes a recessed portion 191 recessed in the direction X2 and forming the discharge port 14 together with the body 10. The cover 19 includes a recessed portion 192 recessed in the direction X2 and forming the inlet port 13 together with the body 10.

The cover 19 includes a cover sliding surface 193 formed continuously to the cover contact surface and extended in a direction perpendicular to the direction X. The recessed portion 192 of the cover 19 is provided with a step portion 194 protruding in the direction X1. The step portion 194 includes a cover sliding surface 194*a* extended in a direction perpendicular to the direction X. The cover sliding surfaces 193 and 194*a* are positioned in the same plane as each other (that is, the positions of the cover sliding surfaces 193 and 194*a* in the direction X are same as each other).

Each of the cover sliding surfaces 193 and 194*a* is in contact with a ring sliding surface 130*b* (refer to FIG. 2) of the adjustment ring 30. The ring sliding surface 130*b* is another surface (a surface positioned at the direction X2 side) of the adjustment ring 30. Each of the cover sliding surfaces 193 and 194*a* is configured to slide and move relative to the ring sliding surface 130*b* when the adjustment ring 30 (refer to FIG. 2) rotates relative to the cover 19.

The cover sliding surfaces 193 and 194*a* of the cover 19 are provided with mating groove portions 193*a* and 194*b*, respectively. The mating groove portions 193*a* and 194*b* are recessed in the direction X2 and configured to mate or engage with the pins 15 and 16, respectively.

As illustrated in FIG. 2, the body sliding surface 121*a* of the body 10, the over sliding surface 193 of the cover 19 (refer to FIG. 3), and the guide hole 38 form or define an internal space portion S1 that is substantially sealed. The pin 15 is arranged at an inner side of the internal space portion S1. In the variable oil pump 100, when the adjustment ring 30 rotates relative to the body 10 and the cover 19, the oil 1 enters the internal space portion S1 (the guide hole 38) little by little from between the body sliding surfaces 121*a* and the ring sliding surface 130*a*, and between the cover sliding surface 193 and the ring sliding surface 130*b*, and then the oil 1 accumulates in the internal space portion S1.

The body sliding surface 122*a* of the body 10, the cover sliding surface 194*a* of the cover 19 (refer to FIG. 3) and the guide hole 39 form or define an internal space portion S2 that is substantially sealed. The pin 16 is arranged at an inner side of the internal space portion S2. In the variable oil pump 100, when the adjustment ring 30 rotates relative to the body 10 and the cover 19, the oil 1 enters the internal space portion S2 (the guide hole 39) little by little from between the body sliding surfaces 122*a* and the ring sliding surface 130*a*, and between the cover sliding surface 194*a* and the ring sliding surface 130*b*, and then the oil 1 accumulates in the internal space portion S2.

The oil 1 accumulated or pooled in each of the internal space portions S1 and S2 (the guide holes 38 and 39) serves as resistance against the relative movement of the adjustment ring 30, and the pins 15 and 16 relative to each other, when the adjustment ring 30 rotates.

(Structure of Draining the Oil Out of the Internal Space Portions S1 and S2)

Next a structure of draining the oil out of the internal space portions S1 and S2 (the guide holes 38 and 39) will be described with reference to FIGS. 3 to 5.

As illustrated in FIG. 3, the cover 19 is provided with a groove portion M1 (an example of a drain passage) and a groove portion M2 (another example of the drain passage). Each of the groove portions M1 and M2 is configured such that the oil 1 accumulated in the guide holes 38 and 39 (the internal space portions S1 and S2) (refer to FIG. 2) is made to drain or go out of the guide holes 38 and 39, by utilizing a pressure difference.

Figure 4:
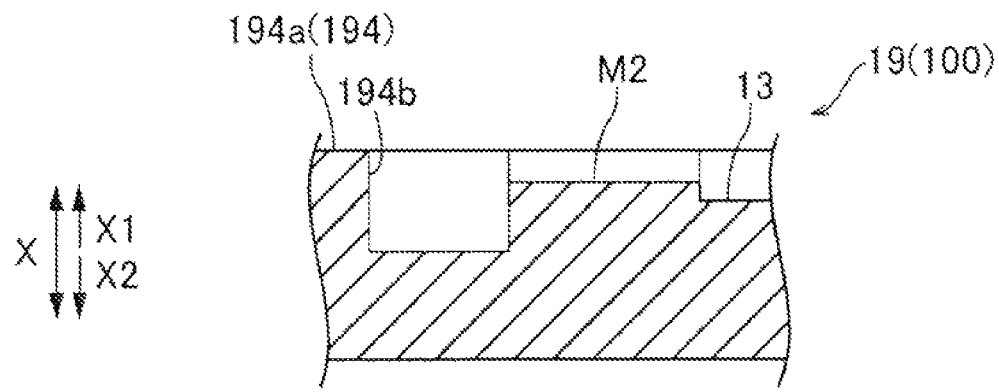
FIG. 4 is a cross-sectional view taken along line IV-IV in FIG. 3.
Figure 5:
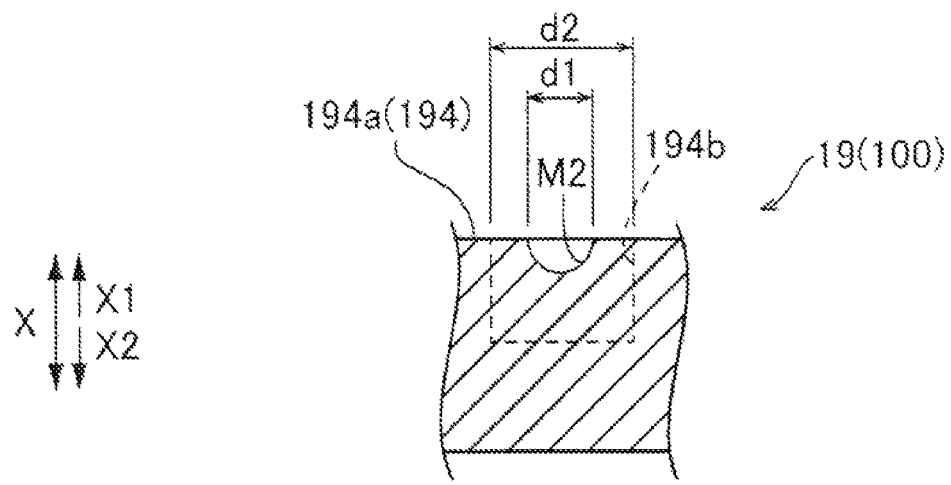
FIG. 5 is a cross-sectional view taken along line V-V in FIG. 3.

In detail, as illustrated in FIGS. 3 and 4, the groove portion M2 extended or elongated in a direction perpendicular to the direction X is provided on the cover sliding surface 194*a* of the cover 19. The guide hole 39 (the internal space portion S2) (refer to FIG. 2) and the inlet port 13 are in fluid communication with each other via the groove portion M2. That is, the groove portion M2 connects the guide hole 39 (the internal space portion S2) to the inlet port 13 in such a manner that the guide hole 39 and the inlet port 13 are in fluid communication with each other. An end portion of the groove portion M2 is extended to the mating groove portion 194*b*, which is a position corresponding to the pin 16, of the cover 19. A passage width d1 of the groove portion M2 is smaller than a diameter d2 of the pin 16. An opening portion of the groove portion M2 of the cover 19, the opening portion at the direction X1 side, is covered with the ring sliding surface 130*b* of the adjustment ring 30 (refer to FIG. 2), and thus the groove portion M2 forms drainage of the oil 1 which allows the guide hole 39 (the internal space portion S2) and the inlet port 13 to be in fluid communication with each other. The groove portion M2 is extended linearly and a longitudinal cross section of the groove portion M2 includes a semicircular shape as illustrated in FIG. 5. The inside of the inlet port 13 is normally maintained at lower pressure so as to suction the oil 1. Accordingly, by allowing the guide hole 39 (the internal space portion S2) and the inlet port 13 to be in fluid communication with each other with the use of the groove portion M2, the oil is drained from the guide hole 39 to the inlet port 13 which corresponds to a negative pressure side relative to the guide hole 39 (the internal space portion S2).

As illustrated in FIG. 3, the groove portion M1 extended or elongated in a direction perpendicular to the direction X is provided at the cover sliding surface 193 of the cover 19. The groove portion M1 is arranged at a side of the discharge port 14 relative to the groove portion M2. That is, the groove portion M1 is arranged to be closer to the discharge port 14 than the groove portion M2 is. The groove portion M1 allows the guide hole 38 (the internal space portion S1) (refer to FIG. 2) and the inlet port 13 to be in fluid communication with each other. That is, the groove portion M1 connects the guide hole 38 (the internal space portion S1) to the inlet port 13 in such a manner that the guide hole 38 and the inlet port 13 are in fluid communication with each other. An end portion of the groove portion M1 is extended to the mating groove portion 193a, which is a position corresponding to the pin 15, of the cover 19. A passage width of the groove portion M1 is smaller than a diameter of the pin 15. An opening portion of the groove portion M1 of the cover 19, the opening portion at the direction X1 side, is covered with the ring sliding surface 130b of the adjustment ring 30, and thus the groove portion M1 forms drainage of the oil 1 which allows the guide hole 38 (the internal space portion S1) and the inlet port 13 to be in fluid communication with each other. The groove portion M1 is extended linearly and a longitudinal cross section of the groove portion M1 includes a semicircular shape. As described above, the inside of the inlet port 13 is normally maintained at lower pressure so as to suction the oil 1. Accordingly, by allowing the guide hole 38 (the internal space portion S1) and the inlet port 13 to be in fluid communication with each other with the use of the groove portion M1, the oil is drained from the guide hole 38 to the inlet port 13 which corresponds to the negative pressure side relative to the guide hole 38 (the internal space portion S1).

(Structure of the Capacity Varying Mechanism)

Next, a structure of the capacity varying mechanism performing a control of a pump capacity, which increases and decreases a discharge amount of the oil, will be described with reference to FIGS. 1, 2 and 6.

The variable oil pump 100 is provided with the capacity varying mechanism configured to change or vary the discharge amount (the pump capacity) of the oil 1 discharged per rotation of the oil pump rotor 20. The capacity varying mechanism is a mechanism which displaces (rotates) the adjustment ring 30 with the use of hydraulic pressure (control hydraulic pressure) of a hydraulic chamber U formed inside the accommodation recessed portion 12c of the bode 10. Relative positions of the inner rotor 21 and the outer rotor 22 relative to the inlet port 13 and the discharge port 14 are changed or varied by the displacement (rotation) of the adjustment ring 30, and thus the pump capacity is changed or varied.

The adjustment ring 30 includes a main body portion 31, projecting portions 32 and 33, an operation portion 34, and a protruding portion 35, as illustrated in FIG. 2.

The projecting portions 32 and 33, the operation portion 34 and the protruding portion 35 are formed to be integral with the main body portion 31. The oil pump rotor 20 is arranged in such a manner that an outer circumferential surface 20a of the oil pump rotor 20 is smoothly in contact with (slides) an inner circumferential surface 31a of the main body portion 31.

The main body portion 31 includes an annular shape and holds or retains the oil pump rotor 20 (the outer rotor 22) from a side of the outer circumferential surface 20a in such a manner that the oil pump rotor 20 (the outer rotor 22) is rotatable. Each of the projecting portions 32 and 33 is formed in a manner that an outer side surface 31b of the main body portion 31 projects radially outwardly (in a radially outward direction of rotation). The projecting portion 32 is provided with the guide hole 38 which is formed in an elongated hole shape including a gradual curve and penetrates the projecting portion 32 in a thickness direction (in the direction X). The projecting portion 33 is provided with the guide hole 39 which is formed in an elongated hole shape including a gradual curve and penetrates the projecting portion 33 in the thickness direction.

The guide hole 38 and the guide hole 39 are spaced away from the inner rotor 21 by a substantially equal distance to each other in the radial direction of the inner rotor 21. The guide hole 38 and the guide hole 39 are positioned to be offset from each other or away from each other by a predetermined angle (for example, substantially 120 degrees) in a circumferential direction of the inner rotor 21. The guide hole 38 is arranged at a side of the discharge port 14 relative to the guide hole 39. That is, the guide hole 38 is arranged to be closer to the discharge port 14 than the guide hole 39 is.

The operation portion 34 is formed to protrude from the outer side surface 31b. When the main body portion 31 rotates, an external force (the hydraulic pressure of the hydraulic chamber U or the biasing force of the coil spring 60) is applied to the operation portion 34. The operation portion 34 includes a vane holding portion 34a formed by recessing a distal end of the operation portion 34 into a recessed shape. A vane 41 is held at the vane holding portion 34a via a plate spring 61. The protruding portion 35 is formed to protrude from the outer side surface 31b and includes a vane holding portion 35a formed by recessing a distal end of the protruding portion 35 in to a recessed shape. A vane 42 is held at the vane holding portion 35a via another plate spring 61. Each of the vanes 41 and 42 includes a length which is substantially same as a thickness (a dimension in the direction X) of the adjustment ring 30, and each of the vanes 41 and 42 is formed of, for example, resin material including a high abrasion-resistance.

As illustrated in FIG. 6, in a state in which the adjustment ring 30 is accommodated in the body 10, the coil spring 60 is fitted into a region where an inner surface 11a of the wall portion 11 and the operation portion 34 face each other. The operation portion 34 is biased in a direction A1 by a stretching force of the coil spring 60. That is, the adjustment ring 30 is biased to rotate (displace) about the input shaft 55 in the clockwise direction in FIG. 6, by a pressing force of the coil spring 60 which acts on the operation portion 34. Thus, when the hydraulic pressure is not working on the operation portion 34, the coil spring 60 is in a state of being most stretched or expanded and the adjustment ring 30 is kept at the initial position P1 where the adjustment ring 30 starts displacing (rotating).

In a state where the adjustment ring 30 is accommodated in the body 10, the hydraulic chamber U is formed in a region surrounded by the inner surface 11a of the wall portion 11, the vanes 41 and 42, and the outer side surface 31b of the adjustment ring 30 from the vane 41 to the vane 42 (including a portion of an outer side surface of the operation portion 34).

In a state where the adjustment ring 30 is accommodated in the body 10, the pin 15 is slidably inserted in the guide hole 38 to be engaged in the guide hole 38, and the pin 16 is slidably inserted in the guide hole 39 to be engaged in the guide hole 39.

Due to the engagement of the pin 15 with the guide hole 38 and the engagement of the pin 16 with the guide hole 39, a guide portion 51 (an example of a second guide portion) and a guide portion 52 (an example of a first guide portion) are configured. The guide portions 51 and 52 guide the displacement (the rotation) of the adjustment ring 30 relative to the body 10. In other words, a direction of the rotation of the adjustment ring 30 is restricted in a direction in which the guide holes 38 and 39 are extended (a lengthwise direction of a cross section of the guide hole 38 and 39) by the guide portions 51 and 52.

As illustrated in FIGS. 1 and 6, the engine 90 is configured to include a hydraulic control apparatus 5 provided at the discharge oil passage 4. The hydraulic control apparatus 5 causes the capacity varying mechanism provided at the variable oil pump 100 to function. Specifically, the variable oil pump 100 and the hydraulic control apparatus 5 are connected to each other with an oil passage 6a branched off from the discharge oil passage 4. The hydraulic control apparatus 5 and the hydraulic chamber U inside the body 10 are connected to each other via an oil passage 6b. While the variable oil pump 100 is being driven, the hydraulic control apparatus 5 is operated in accordance with a control signal from ECU mounted on the engine 90. Accordingly, after part of the oil 1 sent out towards the engine 90 (oil gallery) from the discharge oil passage 4 via an oil filter 7 (refer to FIG. 1) is taken into the hydraulic control apparatus 5 via the oil passage 6a, the oil is supplied to the hydraulic chamber U via the oil passage 6b.

(Capacity Varying Control)

Next, a capacity varying control of the discharge amount of the oil 1 by the variable oil pump 100 will be described with reference to FIGS. 7 and 8.

Figure 7:
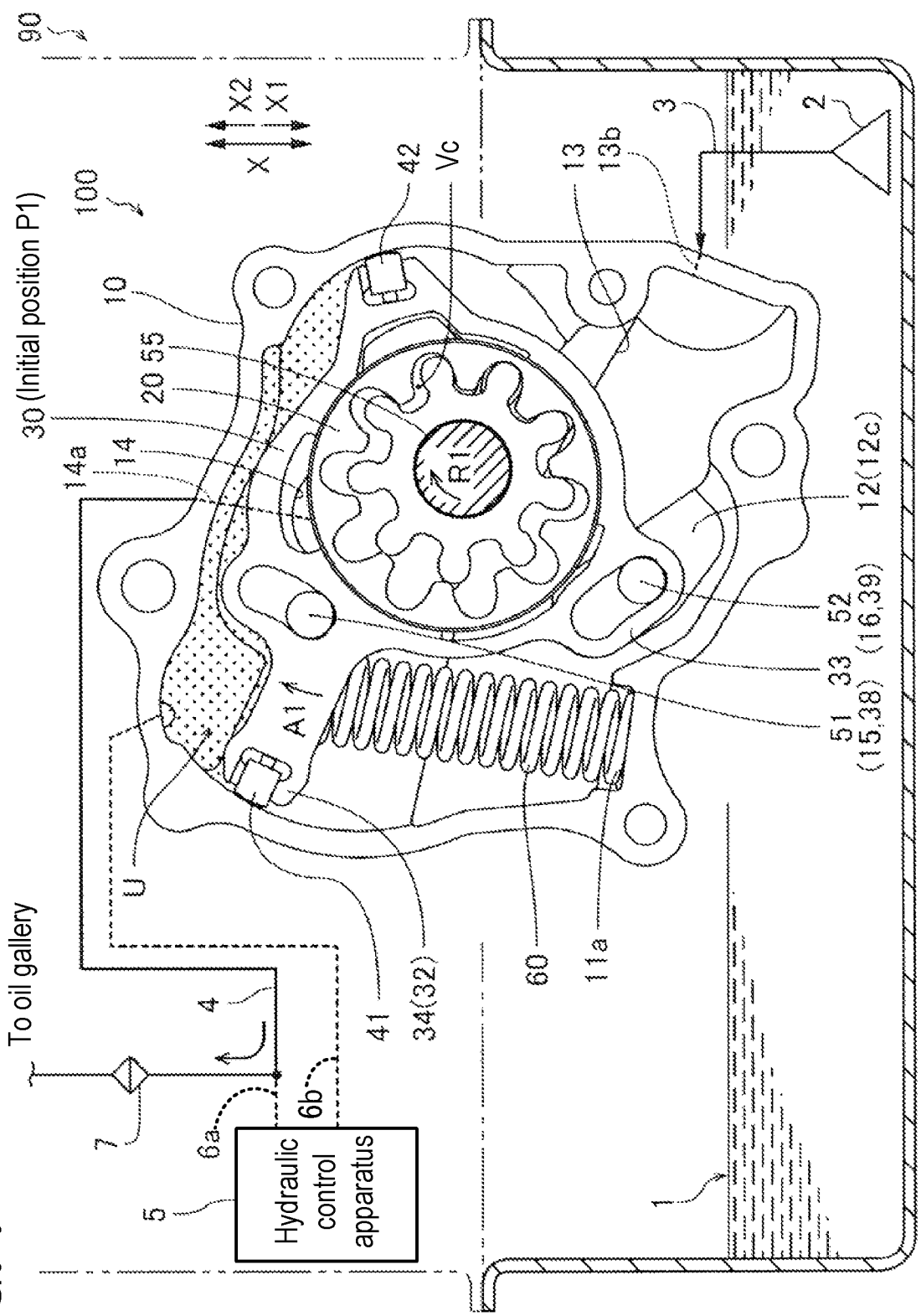
FIG. 7 is a schematic view illustrating a capacity controlled state (an initial position) of the variable oil pump according to the first embodiment.

As illustrated in FIG. 7, first, the oil pump rotor 20 is driven in the direction R1 by the input shaft 55 that is rotated as the engine 90 starts. At this time, the hydraulic control apparatus 5 is not operating and the adjustment ring 30 is maintained at the initial position P1 where the adjustment ring 30 is rotated most in the direction A1 by the biasing force of the coil spring 60. At the initial position P1, an inner side surface 38a of the guide hole 38 and an outer surface of the pin 15 are in contact with each other along a direction in which the pin 15 extends, and an inner side surface 39a of the guide hole 39 and an outer surface of the pin 16 are in contact with each other along a direction in which the pin 16 extends. At the initial position P1, the inlet port 13 faces or opposes a negative pressure acting region in which the pressure of the oil 1 is reduced between the external teeth 21a of the inner rotor 21 and internal teeth 22a of the outer rotor 22, and the discharge port 14 faces or opposes a positive pressure acting region in which the oil 1 is compressed between the external teeth 21a of the inner rotor 21 and internal teeth 22a of the outer rotor 22. Thus, the oil 1 in the oil pan 91 is suctioned through the inlet port 13 to the oil pump rotor 20, while the oil 1 is discharged through the discharge port 14 to the discharge oil passage 4 via the oil passage 14a.

Figure 8:
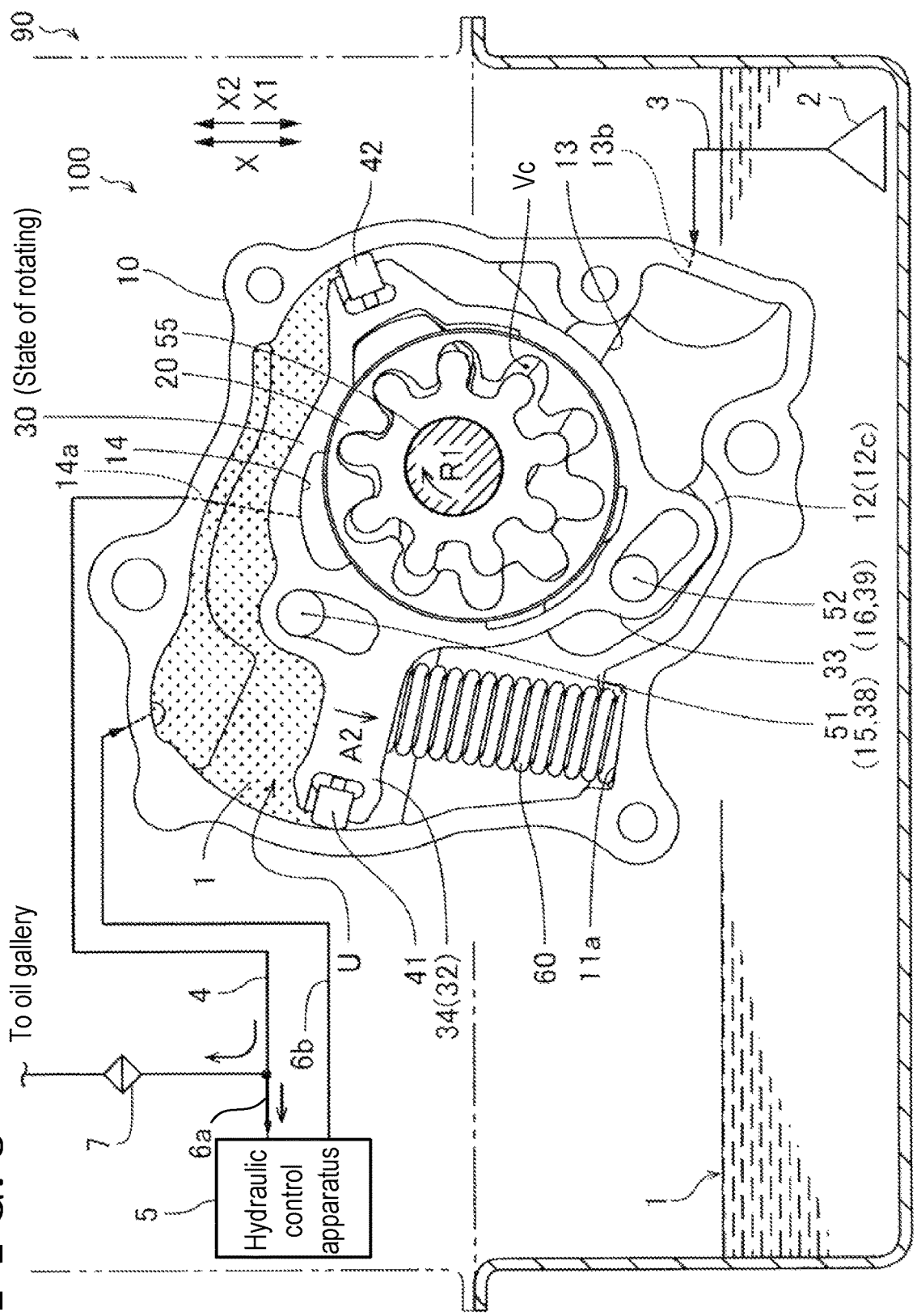
FIG. 8 is a schematic view illustrating a capacity controlled state of the variable oil pump according to the first embodiment.

Next, as illustrated in FIG. 8, the hydraulic control apparatus 5 is operated in accordance with the control signal sent from ECU on the basis of the number of rotations of the engine 90 and/or a load of the engine 90. That is, after the oil 1 from the inlet port 13 is taken into the hydraulic control apparatus 5 via the oil passage 6a, the oil 1 is supplied to the hydraulic chamber U via the oil passage 6b. Then, the hydraulic pressure of the oil 1 that has been supplied to the hydraulic chamber U acts on the operation portion 34 of the adjustment ring 30, and accordingly the adjustment ring 30 starts to rotate in a direction A2 against the biasing force of the coil spring 60.

As the adjustment ring 30 rotates in the direction A2, the outer rotor 22 of the oil pump rotor 20 revolves in the direction A2, in a state where the internal teeth 22a are engaged with the external teeth 21a of the inner rotor 21 and the outer rotor 22 maintains the predetermined amount of eccentricity relative to the rotational center of the inner rotor 21. Thus, the positive pressure acting region and the negative pressure acting region move around the rotational center of the inner rotor 21. Accordingly, negative pressure which acts from the negative pressure acting region to the inlet port 13 decreases and positive pressure which acts from the positive pressure acting region to the discharge port also decreases. As a result, the discharge amount of oil 1 from the oil pump rotor 20 (amount of oil supplied to the engine 90) is reduced.

As the operation of the hydraulic control apparatus 5 is finely controlled by the ECU, hydraulic pressure of the oil 1 supplied to the hydraulic chamber U (the biasing force biasing the operation portion 34 in the direction A2) is adjusted. Thus, a rotational position of the adjustment ring 30 is finely adjusted in response to a balance relation between the hydraulic pressure of the hydraulic chamber U against the operation portion 34 and the biasing force of the coil spring 60 (that is, the biasing force biasing the operation portion 34 in the direction A1). In addition, by adjusting the rotational position of the adjustment ring 30, the discharge amount of the oil 1 of the variable of pump 100 is finely controlled.

Effects of the First Embodiment

According to the first embodiment disclosed here, the following effects can be obtained.

In the first embodiment, as stated above, the groove portion M1 (M2) draining the oil accumulated in the guide hole 38 (39) are provided. Thus, an amount of oil accumulated in the guide hole 38 (39) can be reduced via the groove portion M1 (M2). Further, the oil can be easily drained to the outside the guide hole 38 (39) via the groove portion M1 (M2). As a result, decrease in a response of the control over the pump capacity, which attributes to the oil accumulated in the guide hole 38 (39), can be restrained. Even in a case where the oil is at low temperature, the oil can be drained to the outside of the guide hole 38 (39) via the groove portion M1 (M2).

In the first embodiment, as stated above, the groove portion M1 (M2) is provided to allow the guide hole 38 (39) and the inlet port 13 of the oil to be in fluid communication with each other. Because the inlet port 13 is kept at low pressure (negative pressure) in order to suction the oil, a pressure difference is reliably generated between the guide hole 38 (39) and the inlet port 13. Thus, the oil can be drained from the guide hole 38 (39) effectively.

In the first embodiment, as stated above, the groove portion M1 (M2) which allows the guide hole 38 (39) and the inlet port 13 of the oil to be in fluid communication with each other is provided. Thus, the oil can be drained to the outside of the guide hole 38 (39) with the groove portion M1 (M2) including a simple structure. In addition, the structure draining the oil can be formed easily.

In the first embodiment, as stated above, the groove portions M1 and M2 are provided at the cover 19. Thus, the oil can be drained to the inlet port 13 outside the guide hole 38 (39) via the groove portions M1 (M2) provided at the cover 19.

In the first embodiment, as stated above, the groove portion M1 (M2) is formed to extend to or reach the position of the cover 19, the position which corresponds to the pin 15 (16). Thus, even in a case where the adjustment ring 30 formed with the guide hole 38 (39) moves relative to the pin 15 (16), it is restricted that the groove portion M1 (M2) is blocked with the adjustment ring 30.

In the first embodiment, as stated above, the passage width of the groove portion M1 (M2) is smaller than the diameter of the pin 15 (16). Thus, the internal space portion of the guide hole 38 (39) and the outside of the guide hole 38 (39) can be partitioned or separated from each other more reliably compared to a case in which the passage width of the groove portion M1 (M2) is equal to or larger than the diameter of the pin. Accordingly, the pressure difference between the internal space portion of the guide hole 38 (39) and the outside of the guide hole 38 (39) can be generated more reliably.

(Second embodiment) A structure of a variable oil pump 200 according to the second embodiment will be described with reference to FIGS. 1 and 9. In the second embodiment, the structure (a groove portion M201 serving as an example of the drain passage and a groove portion M202 serving as another example of the drain passage) that drains the oil 1 accumulated or pooled in the guide holes 38 and 39 is provided at a body 210 (an example of the pump housing and an example of the housing main body), unlike the first embodiment where the structure (the groove portions M1 and M2) that drains the oil 1 accumulated in the guide holes 38 and 39 is provided at the cover 19. In the drawings, the same reference number and reference symbol are given to the structure which is similar to the first embodiment, and explanation of such similar structure will be omitted.

Figure 9:
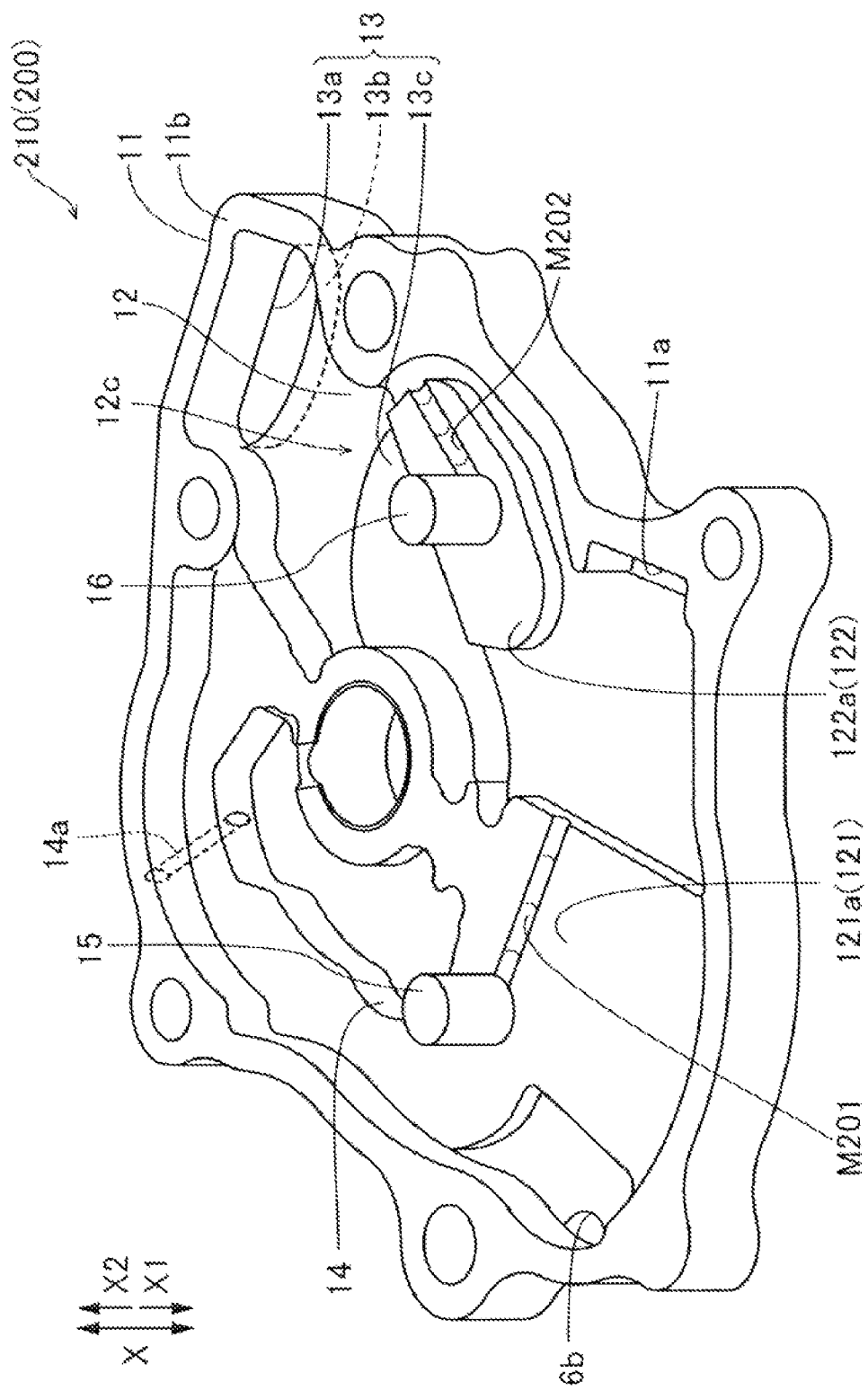
FIG. 9 is a perspective view illustrating a body, which is provided with a groove portion, of the variable oil pump according to the second embodiment.

As illustrated in FIG. 9, the variable oil pump 200 (refer to FIG. 1) includes the body 210 provided with the groove portions M201 and 202.

In detail, the body sliding surfaces 121a of the body 210 is provided with the groove portion M201. The groove portion M201 allows the guide hole 38 (the internal space portion S1) (refer to FIG. 2) and the inlet port 13 to be in fluid communication with each other. That is, the groove portion M201 connects the guide hole 38 (the internal space portion S1) to the inlet port 13 in such a manner that the guide hole 38 and the inlet port 13 are in fluid communication with each other. An end portion of the groove portion M201 is extended to a position of the body 210, the position at which the pin 15 is provided. A passage width of the groove portion M201 is smaller than the diameter of the pin 15. An opening portion of the groove portion M201 of the body 210, the opening portion which is at the direction X2 side, is covered with the ring sliding surface 130a (refer to FIG. 2) of the adjustment ring 30, and thus the groove portion M201 forms a drain route, that is, the drain passage, of the oil 1 which allows the guide hole 38 (the internal space portion S1) and the inlet port 13 to be in fluid communication with each other and which includes a semicircular shape. The groove portion M201 includes a function of draining the oil accumulated in the guide hole 38 (the internal space portions S1), with the use of the pressure difference.

The body sliding surfaces 122a of the body 210 is provided with the groove portion M202. The groove portion M202 allows the guide hole 39 (the internal space portion S2) (refer to FIG. 2) and the inlet port 13 to be in fluid communication with each other. That is, the groove portion M202 connects the guide hole 39 (the internal space portion S2) to the inlet port 13 in such a manner that the guide hole 39 and the inlet port 13 are in fluid communication with each other. An end portion of the groove portion M202 is extended to a position of the body 210, the position at which the pin 16 is provided. A passage width of the groove portion M202 is smaller than the diameter of the pin 16. An opening portion of the groove portion M202 of the body 210, the opening portion which is at the direction X2 side, is covered with the ring sliding surface 130a (refer to FIG. 2) of the adjustment ring 30, and thus the groove portion M202 forms the drain route of the oil 1 which allows the guide hole 39 (the internal space portion S2) and the inlet port 13 to be in fluid communication with each other and which includes a semicircular shape. The groove portion M202 includes a function of draining the oil accumulated in the guide holes 39 (the internal space portion S2), with the use of the pressure difference.

The other structures of the second embodiment are similar to those of the first embodiment.

Effects of the Second Embodiment

According to the second embodiment disclosed here, the following effects can be obtained.

In the second embodiment, as stated above, the body 210 and the cover 19 are provided so as to sandwich the adjustment ring 30 therebetween. The groove portions M201 and M202 are provided at the body 210. Thus, the oil can be drained, via the groove portions M201 and M202 provided at the body 210, to the inlet port 13 that is outside the guide holes 38 and 39.

The other effects obtained by the second embodiment are similar to those of the first embodiment.

Third Embodiment

Next, a structure of a variable oil pump 300 according to the third embodiment will be described with reference to FIGS. 1 and 10. In the third embodiment, the structure (a groove portion M301 serving as an example of the drain passage and a groove portion M302 serving as another example of the drain passage) that drains the oil 1 accumulated or pooled in the guide holes 38 and 39 is provided at an adjustment ring 330 serving as an example of the adjustment member, unlike the first embodiment where the structure (the groove portions M1 and M2) that drains the oil 1 accumulated in the guide holes 38 and 39 is provided at the cover 19. In the drawings, the same reference number and reference symbol are given to the structure which is similar to the first embodiment, and explanation of such similar structure will be omitted.

Figure 10:
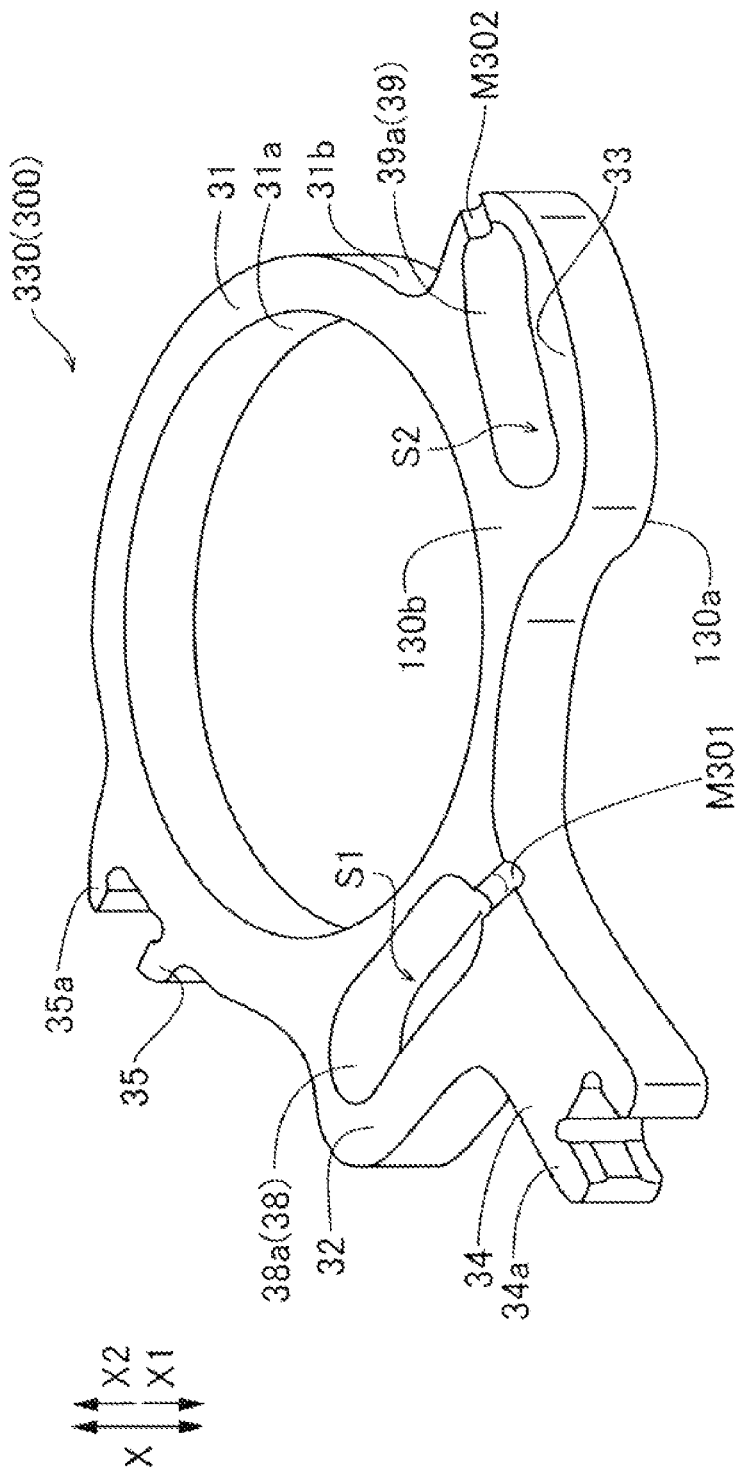
FIG. 10 is a perspective view illustrating an adjustment ring, which is provided with a groove portion, of the variable oil pump according to the third embodiment.

As illustrated in FIG. 10, the variable oil pump 300 (refer to FIG. 1) includes the adjustment ring 330 provided with the groove portions M301 and M302.

In detail, the ring sliding surface 130b of the adjustment ring 330 is provided with the groove portion M301. The groove portion M301 allows the guide hole 38 (the internal space portion S1) and the inlet port 13 (refer to FIG. 2) to be in fluid communication with each other. That is, the groove portion M301 connects the guide hole 38 (the internal space portion S1) to the inlet port 13 in such a manner that the guide hole 38 and the inlet port 13 are in fluid communication with each other. A passage width of the groove portion M301 is smaller than the diameter of the pin 15. An opening portion of the groove portion M301 of the adjustment ring 330, the opening portion which is at the direction X2 side, is covered with the cover sliding surface 193 of the cover 19, and thus the groove portion M301 forms the drain route of the oil 1 which allows the guide hole 38 (the internal space portion S1) and the inlet port 13 to be in fluid communication with each other and which includes a semicircular shape. The groove portion M301 includes a function of draining the oil accumulated in the guide hole 38 (the internal space portions S1), with the use of the pressure difference.

The ring sliding surface 130b of the adjustment ring 330 is provided with the groove portion M302. The groove portion M302 allows the guide hole 39 (the internal space portion S2) and the inlet port 13 (refer to FIG. 2) to be in fluid communication with each other. That is, the groove portion M302 connects the guide hole 39 (the internal space portion S2) to the inlet port 13 in such a manner that the guide hole 39 and the inlet port 13 are in fluid communication with each other. A passage width of the groove portion M302 is smaller than the diameter of the pin 16. An opening portion of the groove portion M302 of the adjustment ring 330, the opening portion which is at the direction X2 side, is covered with the cover sliding surface 194a of the cover 19, and thus the groove portion M302 forms the drain route of the oil 1 which allows the guide hole 39 (the internal space portion S2) and the inlet port 13 to be in fluid communication with each other and which includes a semi-circular shape. The groove portion M302 includes a function of draining the oil accumulated in the guide hole 39 (the internal space portion S2), with the use of the pressure difference.

The other structures of the third embodiment are similar to those of the first embodiment.

Effects of the Third Embodiment

According to the third embodiment disclosed here, the following effects can be obtained.

In the third embodiment, as stated above, the groove portions M301 and M302 are provided at the adjustment ring 330. Thus, the oil can be drained to the inlet port 13 outside the guide hole 38 (39) via the groove portion M301 (M302) provided at the adjustment ring 330. In addition, by forming the groove portion M301 (M302) directly on the adjustment ring 330 provided with the guide hole 38 (39), the groove portion M301 (M302) is always placed in the same positional relation relative to the guide hole 38 (39) even if the guide hole 38 (39) is displaced (moved). Thus, the oil can be drained from the guide hole 38 (39) via the groove portion M302 (M302) in a stable manner.

The other effects obtained by the third embodiment are similar to those of the first embodiment.

Fourth Embodiment

Next, a structure of a variable oil pump 400 according to the fourth embodiment will be described with reference to FIGS. 1 and 11. In the fourth embodiment, a through hole M401 (an example of the drain passage) that drains the oil 1 accumulated in the guide hole 38 is provided, unlike the structure of the first embodiment where the groove portions M1 that drains the oil 1 accumulated in the guide hole 38 is provided. In the drawings, the same reference number and reference symbol are given to the structure which is similar to the first embodiment, and explanation of such similar structure will be omitted.

Figure 11:
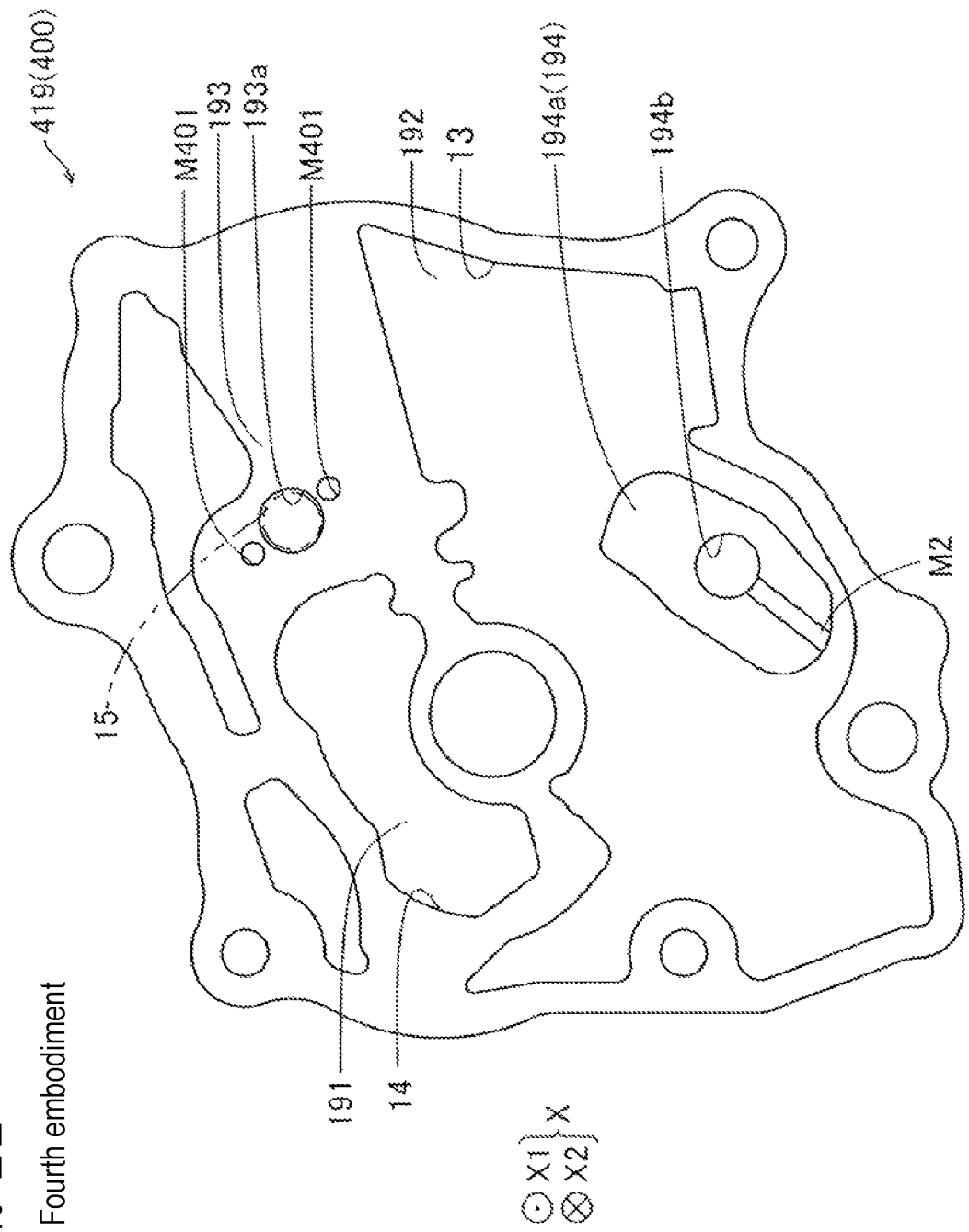
FIG. 11 is a front view illustrating a cover, which is provided with the groove portion and a through hole, of the variable oil pump according to the fourth embodiment.

As illustrated in FIG. 11, the variable oil pump 400 (refer to FIG. 1) includes a cover 419 (an example of the pump housing) provided with the through hole M401. The through hole M401 is extended in a thickness direction (the direction X) of the cover 419 to penetrate the cover 419 in the thickness direction and includes a circular shape. The through hole M401 is arranged at each side relative to the pin 15 (the mating groove portion 193a) along a moving direction in which the guide hole 38 moves relative to the pin 15. That is, for example, two of the through holes M401 are arranged along the moving direction in which the guide hole 38 moves relative to the pin 15, such that the pin 15 is interposed between the two through holes M401. The through holes M401 allow the guide hole 38 (the internal space portion S1) and the outside (the outside of the variable oil pump 400) to be in fluid communication with each other.

Each through hole M401 drains the oil 1 accumulated in the guide hole 38 (the internal space portion S1) to the outside (the outside of the variable oil pump 400) with the use of the pressure difference. As the guide hole 38 moves relative to the pin 15, gas inside the guide hole 38 (the internal space portion S1) is compressed, and accordingly the pressure inside of the guide hole 38 (the internal space portion S1) becomes higher relative to the outside. Thus, the pressure difference arises between the guide hole 38 for draining the oil and the outside (the outside of the variable oil pump 400).

The other structures of the fourth embodiment are similar to those of the first embodiment.

Effects of the Fourth Embodiment

According to the fourth embodiment disclosed here, the following effects can be obtained.

In the fourth embodiment, as described above, the through hole M401 is provided to allow the guide hole 38 and the outside of the cover 419 to be in fluid communication with each other. Thus, the oil can be drained out from the guide hole 38 due to the pressure difference caused by a flow of the oil flowing from the guide hole 38 towards the outside the cover 419, the flow of the oil which is generated when the guide hole 38 moves relative to the pin 15.

In the fourth embodiment, as described above, the through hole M401 is provided at the cover 419 to allow the guide hole 38 and the outside of the cover 419 to be in fluid communication with each other. Thus, the structure for draining the oil can be formed easily.

In the fourth embodiment, as described above, the through holes M401 are provided at the cover 419, and are arranged along the direction in which the guide hole 38 moves relative to the pin 15 in a manner that the through hole M401 is positioned at each side relative to the pin 15. Thus, even in a case where the through hole M401 arranged at one side relative to the pin 15 is closed or blocked with the adjustment ring 30, the through hole M401 arranged at the other side relative to the pin 15 is kept open. Accordingly, the oil can be drained reliably via either one of the through holes M401 arranged respectively at both sides relative to the pin 15.

The other effects obtained by the fourth embodiment are similar to those of the first embodiment.

Modified Examples

It is to be understood that the embodiments disclosed here are exemplary, but are not restrictive, in all respects. The scope of the present disclosure is indicated by the scope of claims, but not by the description in the aforementioned embodiments. The present disclosure includes all the changes and variations (modified examples) made within a range of equivalents to the scope of claims.

For example, in the first to fourth embodiments, the drain route draining the oil is provided at any one of the cover, body and the adjustment ring, however, the present disclosure is not limited thereto. In the present disclosure, the drain route draining the oil can be provided at any two or all of the cover, body and the adjustment ring.

According to the structures of the first to fourth embodiments, the accumulated oil drains from both the two guide holes via the respective drain routes, however, the present disclosure is not limited thereto. The present disclosure can be configured such that the accumulated oil is drained from either one of the two guide holes via the drain route.

In the first to fourth embodiments, the examples are described in which the drain route is formed to extend linearly, however, the present disclosure is not limited thereto. In the present disclosure, the drain route may be curved or may be partly curved.

In the first to fourth embodiments, the drain route is formed such that the longitudinal cross section of the drain route include the semicircular shape (the semicircular shape includes a substantially semicircular shape), however, the present disclosure is not limited thereto. In the present disclosure, the drain route can be formed such that the longitudinal cross section of the drain route includes other shape than the semicircular, including a rectangular shape, for example.

In the third embodiment, the example is described in which the groove portion draining the oil is provided at the adjustment ring, however, the present disclosure is not limited thereto. In the present disclosure, the through hole draining the oil can be provided at the adjustment ring.

In the third embodiment, the example is described in which the groove portion draining the oil is provided at the adjustment ring, on the sliding surface facing towards the cover, however, the present disclosure is not limited thereto. In the present disclosure, the groove portion draining the oil may be provided at the adjustment ring, on the sliding surface facing towards the body.

In the fourth embodiment, the example is described in which the through hole that is in fluid communication with the outside of the variable oil pump is provided at the cover, however, the present disclosure is not limited thereto. In the present disclosure, the through hole that is in fluid communication with the outside of the variable oil pump may be provided at the body.

In the first to fourth embodiments, the examples are described in which the oil pump is mounted on the automobile or vehicle provided with the engine, however, the present disclosure is not limited thereto. The present disclosure is applicable to a variable oil pump for an internal combustion engine mounted on an apparatus or equipment other than a vehicle. As an internal combustion engine, a gasoline engine, a diesel engine and a gas engine are applicable, for example.

According to the aforementioned embodiments, a variable oil pump 100, 200, 300, 400 includes a body 10, 210 (i.e., a pump housing), a cover 19, 419 (i.e., the pump housing), and an oil pump rotor 20 accommodated in the body 10, 210 and the cover 19, 419 and configured to be driven to rotate. The variable oil pump 100, 200, 300, 400 includes an adjustment ring 30, 330 (i.e., an adjustment member) accommodated in the body 10, 210 and the cover 19, 419, the adjustment ring 30, 330 is configured to adjust a discharge amount of oil discharged from the oil pump rotor 20 by displacing in a state where the adjustment ring 30, 330 holds the oil pump rotor 20 from an outer circumferential side in such a manner that the oil pump rotor 20 is rotatable. The variable oil pump 100, 200, 300, 400 includes a first and second guide portions 52 and 51 (i.e., a guide portion) including a guide hole 38, 39 provided at the adjustment ring 30, 330, and a pin 15, 16 provided at the body 10, 210 (i.e., the pump housing) and engaging with the guide hole 38, 39. The guide portion 51, 52 is configured to guide a displacement of the adjustment ring 30, 330 relative to the body 10, 210 and the cover 19, 419 by allowing the guide hole 38, 39 and the pin 15, 16 to engage with each other. The variable oil pump 100, 200, 300, 400 includes a groove portion M1, M2, M201, M202, M301, M302, a through hole M401 (i.e., a drain passage) configured to drain oil accumulated in the guide hole 38, 39.

According to the above-described configuration, the variable oil pump 100, 200, 300, 400 is provided with the groove portion M1, M201, M202, M301, M302 or the through hole M401 (i.e., the drain passage) draining the oil 1 accumulated in the guide hole 38, 39. Thus, the amount of oil accumulated in the guide hole 38, 39 can be reduced via the groove portion M1, M201, M202, M301, M302 and/or the through hole M401. Further, the oil 1 can be easily drained to the outside the guide hole 38, 39 via the groove portion and/or the through hole. As a result, decrease in the response of the control of the pump capacity, which attributes to the oil accumulated in the guide hole 38, 39, can be restrained. Even in a case where the oil 1 is at low temperature, the oil 1 can be drained to the outside of the guide hole 38, 39 via the groove portion M1, M201, M202, M301, M302 and/or the through hole M401.

According to the aforementioned embodiments, the groove portion M1, M2, M201, M202, M301, M302 and/or the through hole M401 is provided in such a manner that the guide hole and at least one of an inlet port 13 of the oil and an outside of the pump housing (i.e., the body 10, 210, the cover 19, 419) are in fluid communication with each other.

According to the above-described configuration, in a case where the guide hole 38, 39 and the inlet port 13 are in fluid communication with each other via the groove portion M1, M2, M201, M202, M301, M302 and/or the through hole M401, the pressure difference is reliably generated between the guide hole 38, 39 and the inlet port 13 because the inlet port 13 is kept at low pressure (negative pressure) in order to suction the oil 1. Thus, the oil 1 can be drained from the guide hole 38, 39 effectively. In a case where the guide hole 38 and the outside of the cover 419 (i.e., the pump housing) are in fluid communication with each other via the through hole 401, the oil 1 can be drained from the guide hole 38 due to the pressure difference caused by the oil flow flowing from the guide hole 38 towards the outside the cover 419, the oil flow which is generated when the guide hole 38 moves relative to the pin 15.

According to the aforementioned embodiment, the drain passage includes a groove portion M1, M2, M201, M202, M301, M302 provided in such a manner that the guide hole 38, 39 and an inlet port 13 of the oil are in fluid communication with each other.

According to the above-described configuration, the oil 1 can be drained to the outside the guide hole 38, 39 via the groove portion M1, M2, M201, M202, M301, M302 including the simple configuration. In addition, the structure through which the oil 1 is drained can be formed easily.

According to the aforementioned embodiment, the pump housing includes a housing main body 10, 210 and a cover 19, 419. The housing main body 10, 210 and the cover 19, 419 accommodate the adjustment ring 30 in such a manner that the housing main body 10, 210 and the cover 19, 419 sandwich therebetween the adjustment ring 30. The groove portion M1, M2, M201, M202 is provided at at least one of the housing main body and the cover.

According to the above-described configuration, the oil 1 can be drained to the inlet port 13 that is in the outside the guide hole 38, 39 via the groove portion M1, M2, M201, M202 provided at at least one of the body and the cover.

According to the aforementioned embodiment, the groove portion M301, M302 is provided at the adjustment ring 330 (i.e., the adjustment member).

According to the above-described configuration, the oil 1 can be drained to the inlet port 13 outside the guide hole 38, 39 via the groove portion M301, M302 formed at the adjustment ring 330. In addition, by forming the groove portion M301, M302 directly on the adjustment ring 330 at which the guide hole 38, 39 is formed, the groove portion M301, M302 is always placed in the same positional relation relative to the guide hole 38, 39 even if the guide hole 38, 39 is displaced (moved). Thus, the oil 1 can be drained from the guide hole 38, 39 via the groove portion M302, M302 in a stable manner.

According to the above-described configuration, the drain passage includes a through hole M401 provided at the cover 419 in such a manner that the guide hole 38 and an outside of the cover 419 are in fluid communication with each other.

According to the above-described configuration, the structure allowing the oil to be drained can be formed easily.

The variable oil pump 100, 200, 300, 400 described above may include configurations described below.

(First Additional Remark)

According to the variable oil pump at which the groove portion is provided at the body (i.e., the housing main body) or at the cover, the groove portion is extended to or reaches the position of the body or the cover, the position which corresponds to the pin.

According to the above-described configuration, even in a case where the adjustment ring (i.e., the adjustment member) formed with the guide hole moves relative to the pin, it is restricted that the groove portion is covered or blocked with the adjustment ring.

(Second Additional Remark)

According to the variable oil pump at which the drain route includes the through hole, the through hole is provided at the pump housing to be arranged at each side relative to the pin such that the through holes are arranged along the moving direction in which the guide hole moves relative to the pin.

According to the above-described configuration, even in a case where the through hole arranged at one side relative to the pin is closed or blocked with the adjustment ring (i.e., the adjustment member), the through hole arranged at the other side relative to the pin remains open. Accordingly, the oil can be drained reliably via either one of the through holes arranged respectively at both sides relative to the pin.

(Third Additional Remark)

According to the variable oil pump disclosed here, the passage width of the groove portion is smaller than the diameter of the pin.

According to the above-described configuration, the internal space portion of the guide hole and the outside of the guide hole can be partitioned or separated from each other more reliably compared to a case in which the passage width of the groove portion is equal to or larger than the diameter of the pin. Accordingly, the pressure difference can be generated more reliably between the internal space portion of the guide hole and the outside of the guide hole.

(Fourth Additional Remark)

According to the variable oil pump disclosed here, the guide portion includes the first guide portion, and the second guide portion arranged at a side of the discharge port, that is, closer to the discharge port than the first guide portion. The groove portion and/or the through hole (i.e., the drain passage) is configured to drain at least the oil accumulated in the guide hole of the second guide portion with the use of the pressure difference.

According to the above-described configuration, the oil can be reliably drained at least from the guide hole at a side of the discharge port, the guide hole in which the oil is likely to accumulate.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A variable oil pump, comprising:
    a pump housing including an inlet port and a discharge port;
    an oil pump rotor accommodated in the pump housing and configured to be driven to rotate to thereby suction oil through the inlet port and into the pump housing from outside of the pump housing and to discharge the oil out of the pump housing through the discharge port;
    an adjustment member accommodated in the pump housing, the adjustment member configured to adjust a discharge amount of oil discharged from the oil pump rotor by displacing in a state where the adjustment member holds the oil pump rotor from an outer circumferential side in such a manner that the oil pump rotor is rotatable;
    a guide portion including a guide hole provided at the adjustment member, and a pin provided at the pump housing and engaging with the guide hole;
    the guide portion configured to guide a displacement of the adjustment member relative to the pump housing by allowing the guide hole and the pin to engage with each other; and
    a drain passage configured to drain oil accumulated in the guide hole,
    wherein the drain passage is provided in such a manner that the guide hole and at least one of the inlet port or the outside of the pump housing are in fluid communication with each other.

2. The variable oil pump according to claim 1, wherein the drain passage includes a groove portion provided in such a manner that the guide hole and the inlet port are in fluid communication with each other.

3. The variable oil pump according to claim 2, wherein
    the pump housing includes a housing main body and a cover, the housing main body and the cover accommodate the adjustment member in such a manner that the housing main body and the cover sandwich therebetween the adjustment member, and
    the groove portion is provided in at least one of the housing main body and the cover.

4. The variable oil pump according to claim 2, wherein the groove portion is provided in the adjustment member.

5. The variable oil pump according to claim 1, wherein the drain passage includes a through hole provided at the pump housing in such a manner that the guide hole and an outside of the pump housing are in fluid communication with each other.

6. The variable oil pump according to claim 1, wherein the inlet port corresponds to a negative pressure side relative to the guide hole.

7. A variable oil pump, comprising:
- a pump housing;
- an oil pump rotor accommodated in the pump housing and configured to be driven to rotate;
- an adjustment member accommodated in the pump housing, the adjustment member configured to adjust a discharge amount of oil discharged from the oil pump rotor by displacing in a state where the adjustment member holds the oil pump rotor from an outer circumferential side in such a manner that the oil pump rotor is rotatable;
- a guide portion including a guide hole provided at the adjustment member, and a pin provided at the pump housing and engaging with the guide hole;
- the guide portion configured to guide a displacement of the adjustment member relative to the pump housing by allowing the guide hole and the pin to engage with each other; and
- a drain passage configured to drain oil accumulated in the guide hole,
- wherein the drain passage includes a through hole provided at the pump housing in such a manner that the guide hole and an outside of the pump housing are in fluid communication with each other.

* * * * *